United States Patent [19]

Yamaguchi

[11] Patent Number: 5,757,504
[45] Date of Patent: May 26, 1998

[54] POSITIONAL MEASUREMENT PROJECTING DEVICE AND MOUNTING STRUCTURE THEREFOR

[75] Inventor: Hiroaki Yamaguchi, Kanagawa, Japan

[73] Assignee: Komatsu Ltd., Tokyo, Japan

[21] Appl. No.: 656,339

[22] PCT Filed: Dec. 16, 1994

[86] PCT No.: PCT/JP94/02120

§ 371 Date: Jun. 16, 1996

§ 102(e) Date: Jun. 16, 1996

[87] PCT Pub. No.: WO95/17647

PCT Pub. Date: Jun. 29, 1995

[30] Foreign Application Priority Data

Dec. 20, 1993 [JP] Japan ................... 5-344965

[51] Int. Cl.$^6$ .................. G01C 15/00; E21D 9/06
[52] U.S. Cl. ................................. 356/400
[58] Field of Search ........................ 356/399, 400

[56] References Cited

U.S. PATENT DOCUMENTS 4,904,081  2/1990  Miyahara ..................... 356/400

FOREIGN PATENT DOCUMENTS

| | | |
|---|---|---|
| 59-68612 | 4/1984 | Japan . |
| 59-68616 | 4/1984 | Japan . |
| 59-06709 | 11/1984 | Japan . |
| 60-212593 | 10/1985 | Japan . |
| 62-133309 | 6/1987 | Japan . |
| 1-314912 | 12/1989 | Japan . |
| 3-48116 | 3/1991 | Japan . |
| 3-211409 | 9/1991 | Japan . |
| 3-257312 | 11/1991 | Japan . |
| 3-79646 | 12/1991 | Japan . |
| 4-310818 | 11/1992 | Japan . |
| 5-107064 | 4/1993 | Japan . |

*Primary Examiner*—Richard A. Rosenberger
*Attorney, Agent, or Firm*—Sidley & Austin

[57] ABSTRACT

A positional measurement projecting device and a mounting structure therefor, which are capable of easily carrying out replacement work and of increasing the efficiency of a tunnel constructing operation. A light receiver (36), receiving an incident laser beam (18), is provided in a body frame (32) of a projecting device (30), and a light emitter (42), emitting a beam (44), is provided rearwardly of the light receiver (36). The light emitter (42) is attached to an outgoing direction regulating device (43), and a local controller (50) adjusts the outgoing elevation angle and the outgoing horizontal angle of the beam (44) through the outgoing direction regulating device (43).

12 Claims, 12 Drawing Sheets

F I G. 2 1 A CONVENTIONAL ART
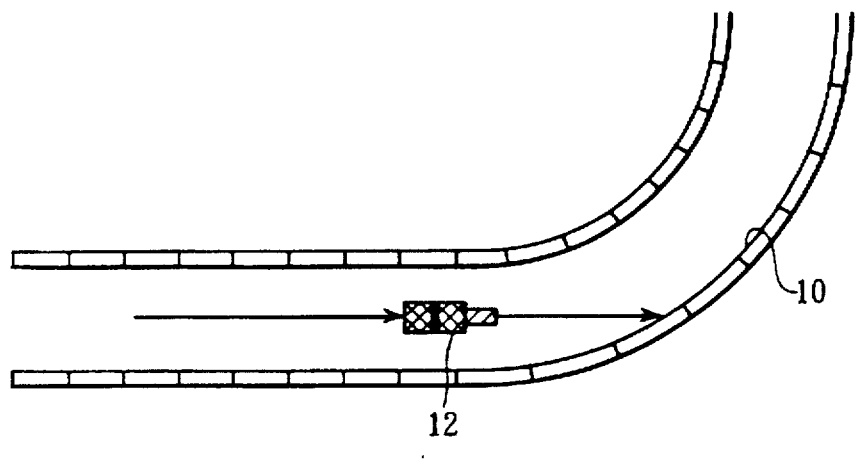
F I G. 2 1 B CONVENTIONAL ART
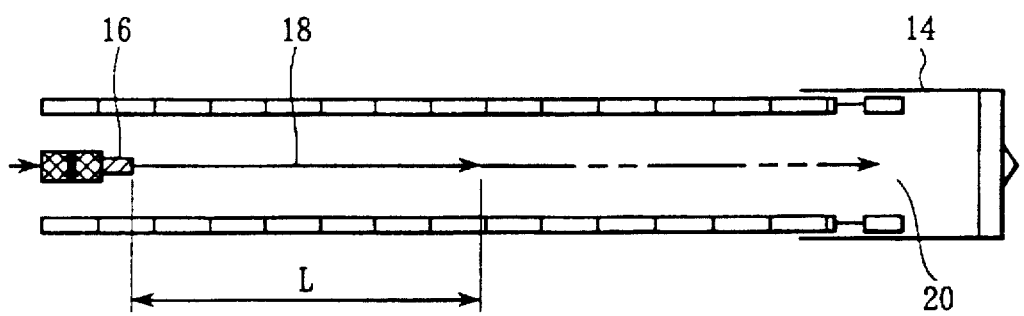
F I G. 2 1 C CONVENTIONAL ART
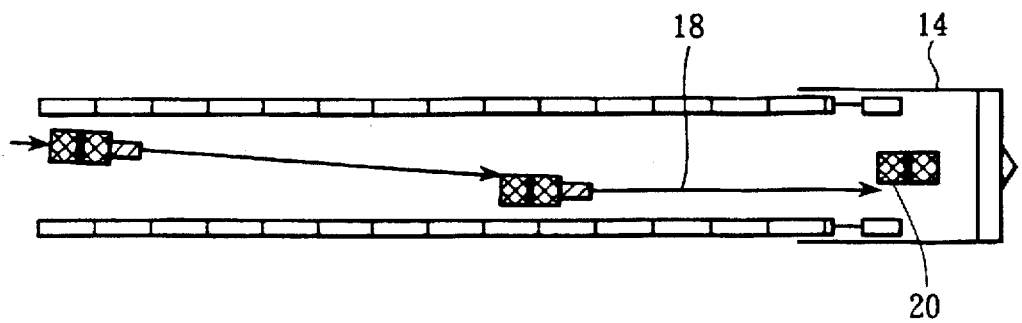

POSITIONAL MEASUREMENT PROJECTING DEVICE AND MOUNTING STRUCTURE THEREFOR

TECHNICAL FIELD

This invention relates to a system for measuring the position and the posture of a tunnel forming machine, and, more particularly, to a positional measurement light projecting device and a mounting structure therefor, which are provided between a control point and a tunnel forming machine in a tunnel, to relay a beam for measuring.

BACKGROUND ART

In the construction of a tunnel, the tunnel is advanced (bored) along a predetermined tunnel planning line by using a tunnel forming machine. Therefore, in order to construct the tunnel as planned, the measurement of the position and the posture of the tunnel forming machine is required from the view of controlling or correcting an erring direction and from the view of avoiding the positional matter with the tunnel forming machine when wall segments are assembled in the later constructing process. Furthermore, increasing considerations for construction, such as alignment complications for advancing the tunnel, construction in an area having considerable subsurface constructions or existing tunnels, and the high accuracy required for alignment in constructing sewerage or the like, have resulted in an increase in the importance and necessity of measuring the position and the posture of the tunnel forming machine.

In order to decide the position and the posture of the tunnel forming machine, it is necessary to determine a total of six elements, with three values indicating the position and three values indicating the posture. The position of the tunnel forming machine can be indicated by using three elements determined by for example, positioning appropriate three-dimensional coordinate systems in the interior of the tunnel, in which, in many cases, the position of the tunnel forming machine is indicated by defining the advancing planning line as one of the coordinates axes and using departure from the advancing distance and the planning line (two elements of the horizontal direction and the vertical direction). Also, the posture of the tunnel forming machine can be indicated by using three elements, for example, the orienting direction of the center axis of the tunnel forming machine (the same direction as the advancing direction) in the horizontal direction (yawing angle), the inclination in the fore-and-aft direction of the tunnel forming machine (pitching), and the rotation around the center axis of the tunnel forming machine (rolling). Lately, while the speed caused by the tunnel forming machine has improved, the speed of measuring the position and the posture which are attained by manpower cannot, however, catch up to the required speed of the construction, so that various suggestions have been offered concerning a method and an apparatus for measuring the position and the posture of the tunnel forming machine.

For instance, Japanese Patent Application Laid-open No. 4310818 discloses a method for measuring the position and the posture of the tunnel forming machine, in which a target prism is suspended in a fixed state from the upper portion of the measured wall segment in the tunnel, and an electro-optical distance meter, a bearing gyro, and a dip meter are provided in the upper portion of the tunnel forming machine.

According to the aforementioned method, when the position of the tunnel forming machine is measured by detecting the bearing (the advancing direction and the yawing angle) of the tunnel forming machine by a gyro-compass the actual distance that the tunnel forming machine excavates should be measured in the advancing direction detected by the gyro-compass. However, the tunnel forming machine is sometimes advanced to excavate during a skid. In consequence, as disclosed in the aforementioned application, in the method of using the electro-optical distance meter, in which the target prism is suspended in a fixed state from a point on the upper portion of the measured wall segment in the tunnel and the electro-optical distance meter measures by receiving reflection from the prism to the upper portion of the tunnel forming machine, the distance between the tunnel forming machine and the target prism can be measured; however, the element of the advancing direction and the element of moving in a plane vertical to the advancing direction cannot be separated. Therefore, when the tunnel forming machine skids, the skidding position includes an error produced by the moving element in a plane vertical to the advancing direction.

Japanese Patent Application Laid-open No. 60-212593 discloses a tunnel forming machine which is provided with a laser projector at the rear portion of the tunnel forming machine, and a beam receiver, a rolling measure, and a macrometer for detecting the distance between the laser projector and the laser receiver, whereby, the position and the posture of the tunnel forming machine are detected and, simultaneously, a laser beam from the laser projector is followed on the planned boring line.

The aforementioned art is intended to resolve a disadvantage in that a measurement corresponding to a curved line in a curved section of the tunnel is difficult from the view of the linearity of the laser beam when the position of the tunnel forming machine is measured by using the laser beam. That is, the laser receiver, the rolling measure, and the macrometer, for detecting the distance between the laser projector and the laser receiver, are provided in the tunnel forming machine to be relative to the laser beam projected from the laser projector provided rearwardly of the tunnel forming machine. Therefore, the three elements of the position of the tunnel forming machine and the three elements of the posture can be measured by using output signals from each measuring device, and the laser beam of the laser projector can be followed on the planned boring line to be capable of corresponding to the somewhat curved line. But, application of this art is predicated on the laser receiver facing the laser projector, resulting in an extremely small usable range.

Japanese Patent Application Laid-open No. 3-211409 discloses a method for measuring in which a rotatable laser projector is provided between the light receivers provided at the tunnel forming machine and the existing wall segment, the rotating angle of the rotatable laser projector is measured by using receiving signals outputted from both of the light receivers, and further the macrometer is provided to measure the distance between the laser projector and both of the light receivers. In consequence, the position of the tunnel forming machine is measured by using the position of the light receiver, provided at the existing wall segment, based on the measured distance and angle.

Japanese Patent Application Publication No. 3-79646 discloses setting a moving point between a fixed point in the tunnel and the tunnel forming machine as the final station. More specifically, in the fixed point, an orientation measuring device is provided and is composed of a laser oscillator, a sighting target, a prism target of the electrooptical macrometer, and a rotation device. And in the tunnel forming machine as the final station, there is provided a measuring device for the tunnel forming machine which is composed of a suspension system for automatically correcting the rolling, a laser position detector, a prism target of the electro-optical macrometer, and a dip meter. In each moving point, a measuring device is provided for the moving point, and is composed of a laser oscillator, a rotation device causing the laser oscillator to be able to rotate in the horizontal plane, an automatic level controller for adjusting the level of the rotation device, an electro-optical macrometer, and a laser position detector. By using the aforementioned means, a measurement angle and a distance are measured in order to measure the position of the final station from the fixed point.

More specifically, in Japanese Patent Application Publication No. 3-79646, when the control point, positioned rearward of the fixed point, and the measuring device, provided in the moving point, are seen from the fixed point, the angle is detected from the difference between the rotating angle, when the control point is seen in hindsight from the fixed point, and the rotation angle, when the measuring device provided in the moving point is seen from the fixed point, by using the laser oscillator fixed in the rotation device of the orientation measuring device. The distances between the moving point and the fixed point, the final station and the other moving point are measured by using the electro-optical macrometer, provided in the measuring device for the moving point, and the prism targets, provided in the orientation measuring device and in the measuring device for the tunnel forming machine. And when the moving point is changed with positions by advancing the tunnel forming machine, by measuring again with the aforementioned means, the position of the tunnel forming machine can be adapted to be detected in succession, therefore, the position of the tunnel forming machine for the control point can be determined at any time with the same principle as the traverse survey.

In a method for a constructing operation in a curved line, like the normal traverse survey, a middle station is provided between the control point and the station defined by the tunnel forming machine. Art for measuring the position of the tunnel forming machine with respect to the control point is considered, in which an angle, formed with a line between the control point and the middle station and a line between the middle station and the station of the tunnel forming machine, along with each length are measured. Under the aforementioned thinking, in Japanese Patent Application Laid-open No. 3-211409 and Japanese Patent Application Publication No. 3-79646, by providing the macrometer in the middle surveying point (the moving point or the provided point of the rotatable laser oscillator), the distances between the control point and the middle surveying point and between the middle surveying point and the station defined in the tunnel forming machine are measured. According to the aforementioned structure, however, as shown in FIG. 21A, during the constructing operation in a curved line for the wall 10 of the constructed tunnel, the station of the tunnel forming machine cannot be seen from the middle station 12, so that the laser beam is inhibited from going forward beyond the wall 10 of the tunnel, resulting in the impossibility of measuring the position of the tunnel forming machine.

On the other hand, in the normal traverse survey when the station of the tunnel forming machine cannot be seen from the middle station, a new station is provided on the existing wall segment at a point capable of seeing the tunnel forming machine and being more adjacent to the tunnel forming machine than the middle station, and by defining the former middle station as a new control point, the position of the tunnel forming machine is measured. From a similar view, in Japanese Patent Application Laid-open No. 3-211409, the light receiver provided in the control point, the rotatable laser projecting device, and the macrometer are moved to the other provided positions, and in Japanese Patent Application Publication No. 3-79646, the orientation measuring device and the measuring device for the moving point are moved to the other provided positions, that is, by carrying out the so-called "replacement work", a countermeasure against the tunnel curved portion is allowed. However, in art described in both of those publications, it is required to move two measuring devices to the other provided positions during one replacement work. Further, the replacement work is required even when the tunnel constructing operation is carried out in a straight line section of the tunnel.

More specifically, even though dependent on the inside condition (for example, the humidity, airborne dust, the temperature, etc.) of the tunnel, the reachable distance of the laser beam is approximately 200 m in general. Therefore, as shown in FIG. 21B, when a shield machine 14 digs further than the detectable distance L for a laser beam 18 emitted from a laser projecting device 16, the laser beam 18 cannot reach a light receiver 20 which is provided in the shield machine 14, so that the position of the shield machine 14 should be moved to be detected by carrying out the replacement work. Further, the posture and the position of the shield machine 14 are changed by the advancing movement of the shield machine 14; therefore, the laser beam 18, which has been projected into the light receiver 20 of the shield machine 14 thus far, deviates from the light receiver 20 as shown in FIG. 21C, that is, there is a possibility of producing a so-called target-out. In this case, the replacement work has to be carried out with a newly provided station between the station and the station produced with the target-out.

However, in the replacement work described in Japanese Patent Application Publication No. 3-79646, when a laser rotation axis of the orientation measuring device does not intersect with a horizontal plane at a right angle, an error is produced in the measurement of the angle formed with the control point, the fixed point and the moving point. In consequence, it is necessary to provide an orientation measuring device during the adjustment for retaining the horizontal state of the measuring device, with the result that the replacement work is complicated and requires a lot of time. The aforementioned point also applies to Japanese Patent Application Laid open No. 3-211409 in which the rotatable laser projecting device is used.

Further, the laser oscillator described in Japanese Patent Application Publication No. 3-79646 is facilitated to detect and control the rotation in the horizontal plane and the angle detection of the elevation direction; however, an error is produced in the measured distance when there is a difference in the levels of the measuring devices. In order to control the measuring error of the distance, the level of each of the orientation measuring device, the measuring device for the moving point, and the measuring device of the tunnel forming machine is required to be adjusted. The aforementioned point also applies to the case of the adjustment of the optical axis of the electro-optical macrometer, which is described in Japanese Patent Application Laid-open No. 3-211409. In consequence, the replacement work in the conventional art is an operation requiring not only the change of the position of the measuring device, but also a great expense of effort, resulting in an obstacle to both speed and efficiency of the tunnel construction.

SUMMARY OF DISCLOSURE OF THE INVENTION

A positional measurement light projecting device according to the present invention, which is provided between a control point and a tunnel forming machine in a tunnel to relay a light beam emitted from a light source provided at the control point or the tunnel forming machine to the other, is characterized by including a light receiving device which receives an incident light beam emitted from the light source; a light emitting device having a laser oscillator emitting a light beam in the appropriate opposite direction from the received direction in the light receiving device, and for adjusting the elevation angle and the horizontal angle of the light beam emitted in the appropriate opposite direction; a control system for finding the incident direction of the light beam projected into the light receiving device based on a receiving light signal outputted by the light receiving device and controlling to cause the emission direction of the light beam from the light emitting device to be toward a specified target point by adjusting the elevation angle and the horizontal angle; and a body provided therein with the control unit, the light receiving device and the light emitting device.

Each of the light beams emitted from the light source and from the light emitting device is a linear beam; the body includes a rolling detection device for detecting rotation around an axis which is parallel to the axis of the tunnel; and the light receiving device has a position detecting sensor for two-dimensionally detecting a projected point when receiving the light beam emitted from the light source and for detecting the incident direction of the light beam, so that the control system can adjust the elevation angle and the horizontal angle of the light emitting device based on the detected rotation, the detected projected point, and the incident direction.

The body can be provided with a light distance measuring device for measuring the distance to the target point, to adjust the elevation angle and the horizontal angle.

According to the aforementioned structure, the control system finds the incident direction of the light beam emitted from the light source to the light receiving device, and further, causes the direction of the light beam emitted from the laser oscillator of the light emitting device to project toward the specified point by adjusting the elevation angle and the horizontal angle. Therefore, the conventional precise regulation of the optical axis and the level are not required, resulting in a the possibility of smooth replacement work, and by extension to provide speed and efficiency of the tunnel constructing operation. When each of the light beams emitted from the light source and the light emitting device is defined as a linear beam, it is easier to find the direction of the incident light beam into the light receiving device. By producing the position detecting sensor for two-dimensionally detecting the projected point and detecting the incident angle of the light beam, the projected point of the linear beam can be detected in a horizontal plane and in a vertical plane, and further, the degree that the position of the incident light beam into the light receiving device, provided in the body, moves and information as to the posture of the body, can be detected. In consequence, the adjustment for the emission direction is easier. Furthermore, for a unnecessary certification of bearing linking the body and the light emitting device of another device which projects the light beam to the light receiving device in the body, the emission direction can be fixed at any time. By using the information as to the position, the emission direction, and the distance from another device which projects the linear beam toward the body, even when the position of the body is moved by receiving the advancing reaction of the tunnel forming machine, the degree of movement can still be detected.

Further, since the rolling detection device is provided in the body, to detect the rolling degree of the body, an effect caused by the rolling of the incident direction of the light beam received into the light receiving device can be prevented. Therefore, pitching degree and yawing degree of the light receiving device (the body) can be found relative to an absolute horizon and, simultaneously, the projected point of the linear beam can be found on a horizontal plane and a vertical plane which relate to an absolute horizon, with the result that, by taking these points into account, the emission direction of the light beam from the light emitting device can be exactly set.

Incidentally, if the light distance measuring device, capable of adjusting the elevation angle and the horizontal angle, is provided in the body, the distance to the target point, for example, the tunnel forming machine can be measured, and further, the light distance measuring device can be certainly oriented to face to the reflection device at the target point, resulting in the reliability of distance measurement.

Next, the mounting structure for the light projecting device according to the present invention is characterized by including a jig body attached to an upper portion of a light projecting device; a plurality of retention elements provided in an upper portion of the jig body so as to open outwardly and to close; a resilient body biasing each retention element to open; a stop element provided on an existing wall segment and having an opening for permitting a jig body to enter the central portion thereof and cause the opened retention elements to stop; and a closing member located above the stop element so as to move in the vertical direction and close the retention elements when said jig body enters the closing member. The resilient body can be a spring. The spring can be a coil spring located in the jig body to bias an inserted jig body portion of each retention element in the opening direction; and further, it can be a coil spring, a plate spring, or the like, provided between the jig body and a retention element to correspond to that retention element. It is advisable that the jig body has a through hole for a wire for moving the jig body upwardly and downwardly in the vertical direction, and that the stop element be provided with a wire hitching element for hitching the wire, being provided above the stop element.

According to the aforementioned structure, the projecting device can be easily attached to the existing wall segment by lifting the upper portion of the jig body above the opening in the stop element and by stopping and supporting the astride retention elements on the stop element. By moving the jig body further upwardly, the closing member closes the retention elements, so that the stopping state of the retention elements, which is caused by the stop element, is released, and the light projecting device can be easily detached from the wall segment by using the jig body. Therefore, the light projecting device can be easily attached/detached.

The resilient body can be a spring or rubber. When the spring is a coil spring located in the jig body, the structure can be simple. Since the jig body is provided with the through hole for the wire, and the wire hitching element for hitching the wire is provided above the stop element, the jig body attaching the light projecting device can be moved upwardly and downwardly, e.g., by the use of a pulley, by hitching the wire passed through the jig body to the wire hitching element. In consequence, the attachment and detachment of the light projecting device can be easily carried out.

BRIEF DESCRIPTION OF THE DRAWINGS

FIGS. 7A to 7G show a sequence of operations of the attachment jig of the projecting device according to the preferred embodiment, in which FIGS. 7A to 7C are explanatory views of attachment operations and FIGS. 7D to 7G are explanatory views of detachment operations;

FIGS. 17A and 17B show examples of measuring the distance by using an electro-optical distance meter according to the preferred embodiment, in which FIG. 17A is an explanatory view when the electrooptical distance meter is provided in the projecting device, and FIG. 17B is an explanatory view when the electro-optical distance meter is provided in a shield machine;

FIGS. 21A to 21C show the required state of the replacement work according to the conventional art, in which FIG. 21A is an explanatory view when the position of the tunnel forming machine cannot be measured, FIG. 21B is an explanatory view when the tunnel is dug further than the detecting capacity distance of the laser beam, and FIG. 21C is an explanatory view when the laser beam misses the light receiver.

BEST MODE FOR CARRYING OUT THE INVENTION

Preferred embodiments as to a positional measurement projecting device and a mounting structure for a projecting device according to the present invention will be explained in detail below with reference to the attached drawings.

Figure 1:
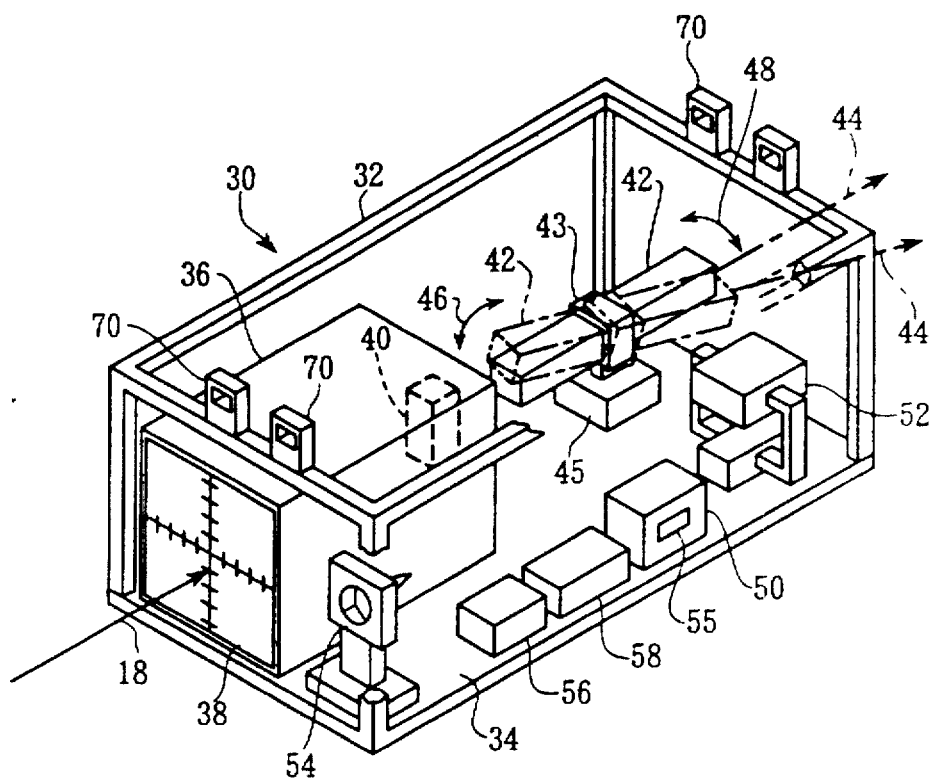
FIG. 1 is a perspective view of a positional measurement light projecting device (described as "a projecting device" in the following) according to the preferred embodiment of the present invention.
Figure 2:
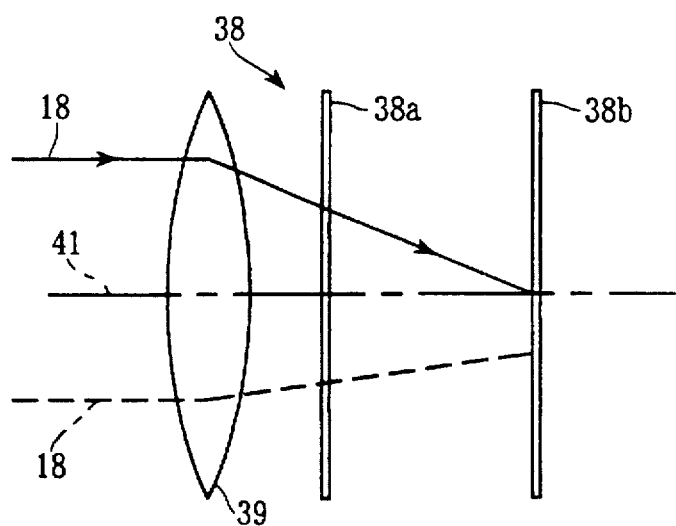
FIG. 2 is a detail explanatory view of a light receiving device in FIG. 1.

In FIG. 1, a projecting device (a positional measurement light projecting device) 30 is provided with a light receiver 36, fixed on a bottom plate 34 of a body frame 32. The light receiver 36 includes a light receiving device 38, for receiving the incidence of a laser beam 18 composed of a linear beam, and having a first light receiving face 38a and a second light receiving face 38b as shown in FIG. 2. A condenser lens 39 is located in a position forward of the first light receiving face 38a. Each of the light receiving faces 38a and 38b is composed of a position detecting sensor for two-dimensionally detecting a projected point. The first light receiving face 38a is transparent or translucent so as to be capable of allowing the laser beam 18 to pass therethrough. An optical axis 41 of the lens 39 intersects the light receiving faces 38a and 38b at a right angle, to correspond to the center (the origin) of the second light receiving face 38b, and to provide focus at the center of the second light receiving face 38b. In consequence, the incident laser beam 18 (a solid line), entering in parallel with the optical axis 41, is received at the center of the second light receiving face 38b. Further, the light receiver 36 includes a rolling measure 40 to detect a rotating degree (a rolling degree) around an axis parallel with the axis of the tunnel (a planning line), namely, the approximate advancing direction of the incident laser beam 18.

In the rear direction of the light receiver 36, a light emitter 42 is provided. The light emitter 42 is composed of a laser oscillator, in which a linear beam 44 is emitted in approximately the reverse direction from the incident direction of the laser beam 18. The light emitter 42 is attached to an outgoing direction regulating device 43, which includes a motor, such as a stepping motor or a direct drive motor, not shown). The outgoing direction regulating device 43 changes the orientation of the light emitter 42, as illustrated with a dashed line in the drawing, to adjust the projecting direction of the beam 44, in order to positively project the beam 44 toward a target (a target point). That is, the outgoing direction regulating device 43 has, for example, a rotating stage with two axes, and is controlled by a local controller 50 of a control unit, in which the light emitter 42 is swung in the vertical direction as shown with an arrow 46, and further is swung in the horizontal direction (in a plane parallel to the floor face 34) as shown with an arrow 48, whereby the elevation angle and the horizontal angle of the beam 44 are adjusted. The elevation angle and the horizontal angle of the light emitter 42 are detected by an angle detector 45 and inputted to the local controller 50.

An electro-optical macrometer 52, serving as a light distance measuring device, is located next to the light emitter 42. The electro-optical macrometer 52 determines the distance to the target point by projecting a measuring beam in approximately the same direction as the linear beam 44 and receiving light reflected by the target point.

The electro-optical macrometer 52, as well as the light emitter 42, can be adjusted with the elevation angle and the horizontal angle to orient face-to-face with the reflecting device of the other projecting devices, the tunnel forming machine, or the like. A reflection prism 54, serving as a reflection device for measuring distance, is provided next to the light receiver 36. The reflection prism 54 returns to the projected direction the beam for measuring distance, which is outputted by the electro-optical macrometer of another projecting device or the like and enters from the same direction as the laser beam 18. Incidentally, the locations of the electro-optical macrometer 52 and the reflection prism 54 can be mutually switched.

Figure 3:
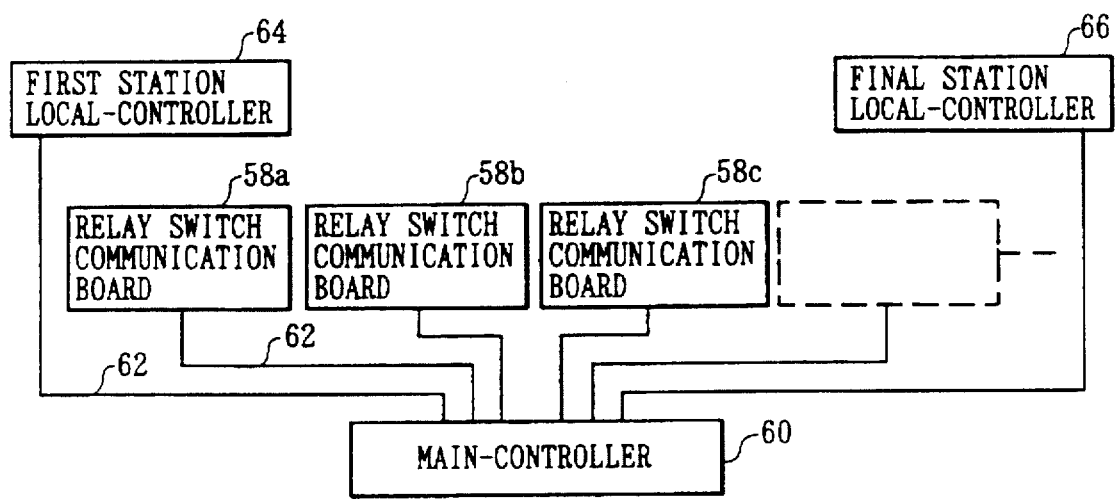
FIG. 3 is a systematic block diagram wherein multiple projecting devices according to the preferred embodiment are connected to a main controller in parallel.

In the controller 50, a screen 55 is provided to indicate the position and the posture of the projecting device 30, the projecting direction of the beam 44, etc. Further, the projecting device 30 has a power source 56, for sending electric power to the local controller 50 and to every measuring device, and a communication board 58. The communication board 58 is connected through a communication cable 62 to a main controller 60, which is provided above ground or the like as shown in FIG. 3, which can transmit data determined by the local controller 50 to the main controller 60, and further, can offer data or instruction from the main controller 60 to the local controller 50.

Figure 4:
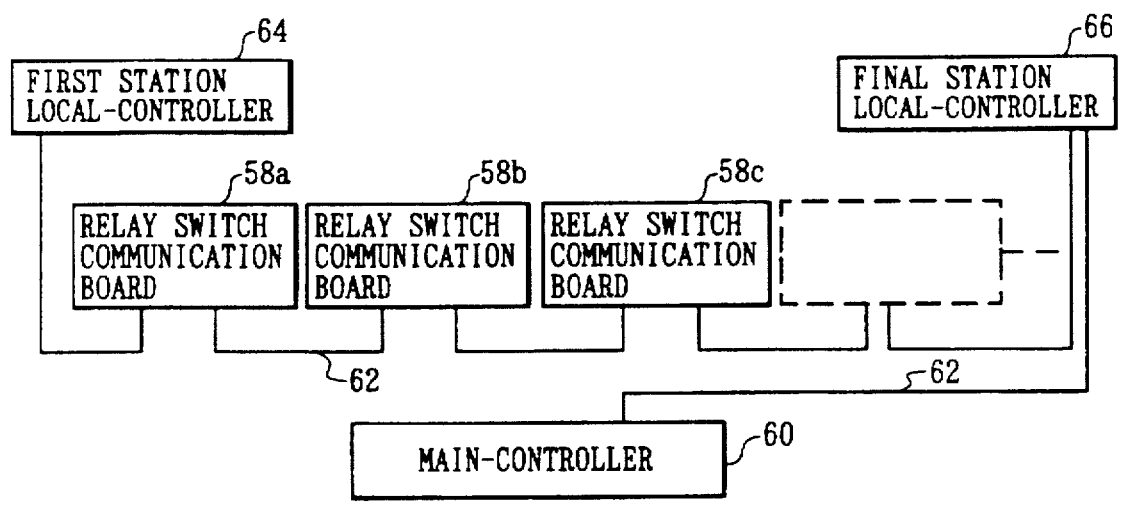
FIG. 4 is a systematic block diagram wherein multiple projecting devices according to the preferred embodiment are connected to the main controller in series.

The main controller 60 is connected in parallel with a first station local controller 64, located at a control point (the first station) of a vertical tunnel starting shaft (not shown) or the like, a final station local controller 66, located at a shield machine 14 as the final station, and each of the communication boards 58a, 58b, 58c, . . ., of the projecting device 30, shown in FIG. 1, which are assigned in numbers between the first station and the final station, in which the main controller 60 gives/receives information to/from the local controllers and the communication boards. Incidentally, as shown in FIG. 4, the first station local controller 64, each of the communication boards 58a, 58b, 58c, . . ., the final station local controller 66, and the main controller 60 can be connected in series.

Figure 5:
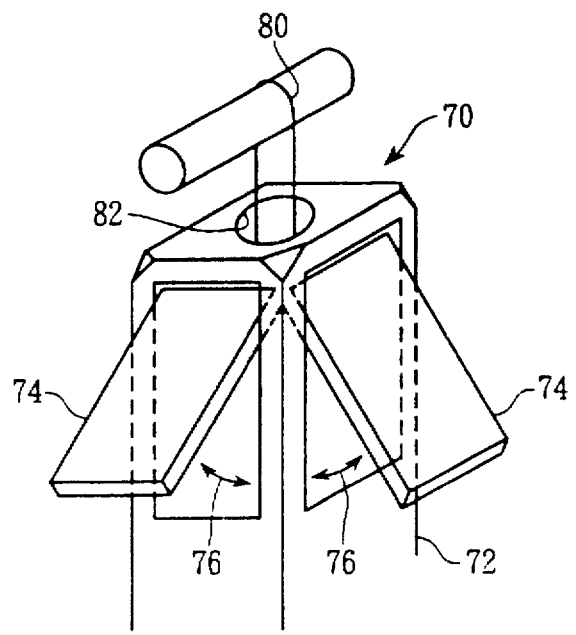
FIG. 5 is a perspective view of an attachment jig body according to the preferred embodiment.

On the body frame 32 of the projecting device 30, a plurality of attachment jigs 70 are provided to attach and detach the projecting device 30 to and from the existing wall segment. As shown in FIG. 5 each attachment jig 70 includes a jig body 72 which is formed in an approximately quadrangular tubular shape to have four retention elements 74 at the upper portion of the jig body 72. Each retention element 74 is retractably mounted to the jig body 72 so as to open and close as shown by the arrows 76 in the drawing. Inside the jig body 72, a compressed astride coil spring 78 is provided (see FIG. 7A), which biases each retention element 74 to move in its opening direction. In the upper portion of the jig body 72, a hole 82 is formed to pass a lifting wire 80.

As a relay switch, the projecting device 30 of the embodiment as structured above is attached to and detached from the existing wall segment by using a threaded member blocking a backfill feeding hole in the existing wall segment.

Figure 6:
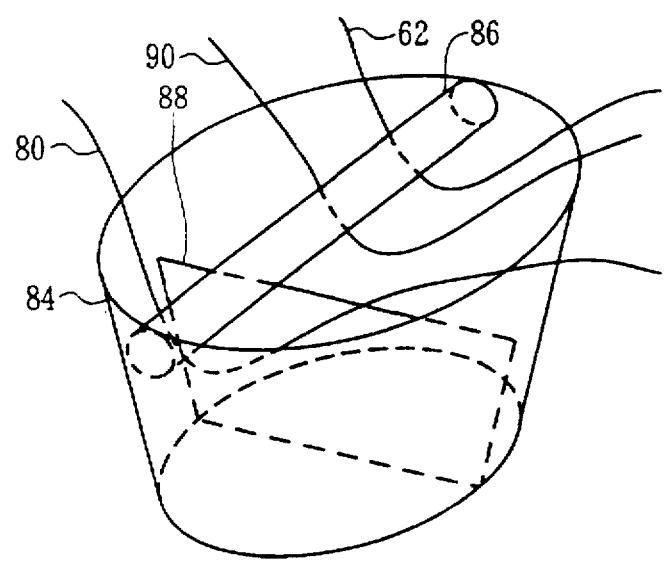
FIG. 6 is an explanatory view of a threaded member, screwable into a backfill feeding hole in a wall segment, according to the preferred embodiment.
Figure 8:
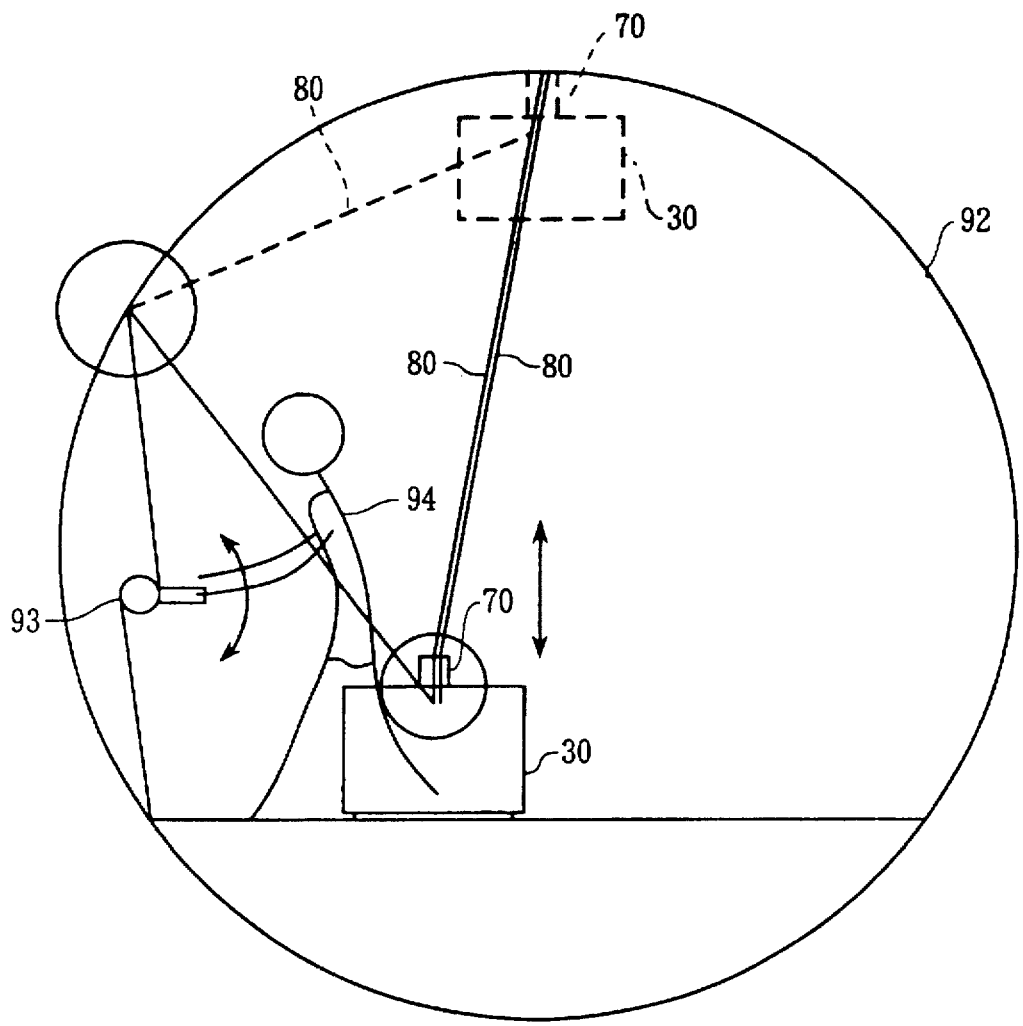
FIG. 8 is an explanatory view of the operation for attaching/detaching the projecting device according to the preferred embodiment.

That is, as shown in FIG. 6, the threaded member 84, which blocks the backfill feeding hole, is provided with a pin 86 as a wire hitching element, and further has a partition 88. The lifting wire 80 is hitched to the pin 86 at one side of the partition 88 in order to prevent damage to the communication cable 62 and a power source cable 90 which are hitched at the other side of the pin 86. The threaded member 84, in which the lifting cable 80, etc., are hitched to the pin 86 as described above, is screwed in a backfill feeding hole located in the wall segment and positioned in the upper portion of a wall segment ring 92 as shown in FIG. 8. The lifting wire 80, hitched to the pin 86, is adapted to pass both its ends through the jig body 72 via the hole 82 as shown in FIG. 5, and then to be combined with the projecting device 30 at one end. And, the other end of the lifting wire 80 is hitched to a pin in a threaded member, similar to the threaded member 84 shown in FIG. 6, which is screwed in the backfill feeding hole in the wall segment adjacent to the aforementioned wall segment, and then it is combined with a chain block 93 (see FIG. 8).

Figure 7A:
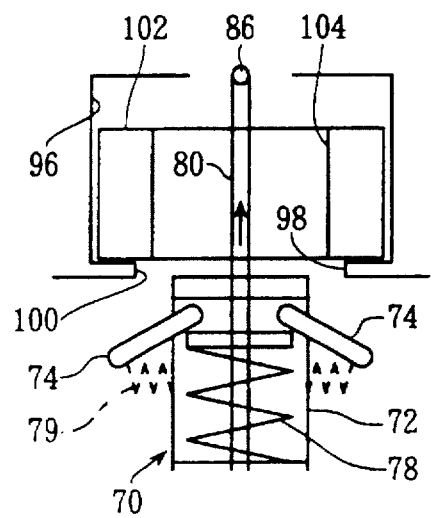

When an operator 94 operates the chain block 93 to wind the lifting wire 80, the attachment jig 70, connected to the projecting device 30, lifts up as shown in FIG. 7A. In the upper portion of the wall segment ring 92, to which the threaded member 84 is attached, a stop element 98, for stopping the retention elements 74 of the attachment jig 70, is provided toward the inside of a chamber 96 and at the lower portion of the chamber 96. Further, the chamber 96 contains a vertically movable closing member 102 which is formed to be larger than an opening 100, formed by the stop element 98 and entered by the jig body 72. The closing member 102 is formed at its central part with a hole 104 for receiving the jig body 72, which is smaller than the opening 100.

Figure 7B:
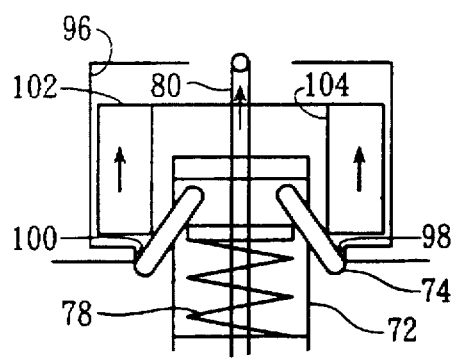
Figure 7C:
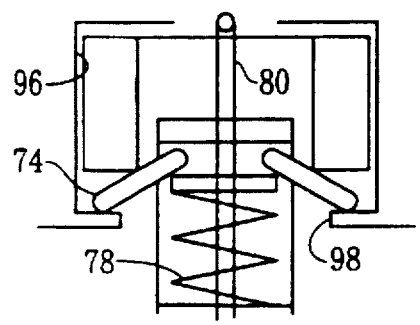

As the lifting wire 80 is wound with the chain block 93, the upper portion of the jig body 72 further enters the hole 104, formed through the closing member 102, via the opening 100 as shown in FIG. 7B. At this time, the retention elements 74 push up the closing member 102 and, in turn, are closed by the stop element 98. With a loosening of the lifting wire 80 when the retention elements 74 reach above the stop element 98, the retention elements 74 are opened by the astride coil spring 78 to be caught by the stop element 98. Therefore, as shown in FIG. 7C, the projecting device 30 is attached through the attachment jig 70 to the wall segment ring 92.

Figure 7D:
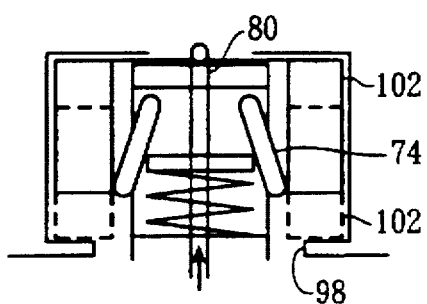
Figure 7E:
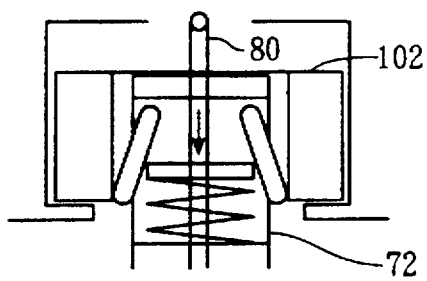
Figure 7F:
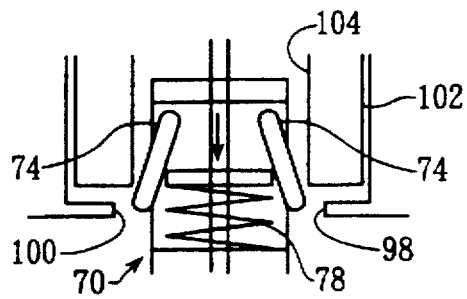
Figure 7G:
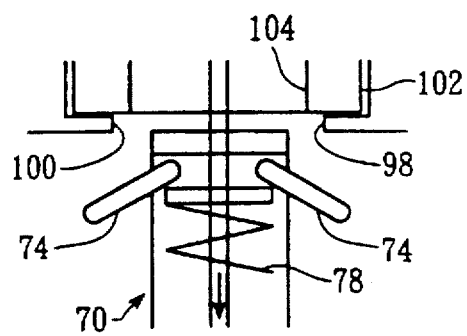

Next, when the projecting device 30 is detached (see a broken line in FIG. 8), the lifting wire 80 is wound with the chain block 93 to cause the retention elements 74 to enter the inside of the hole 104 formed in the closing member 102. Therefore, the retention elements 74 are closed by the closing member 102 as shown in FIG. 7D; naturally, the closing member 102 drops onto the stop element 98 by its self weight, as illustrated with a broken line. Now, releasing the lifting wire 80 through the chain block 93, the upper end portion of the jig body 72 slides downwardly within the closing member 102 as shown in FIG. 7E. The upper end portion of the attachment jig 70 emerges into a position below the stop element 98, as shown in FIGS. 7F and 7G, as the hole 104 formed by the closing member 102 is smaller than the opening 100, and the retention elements 74 are opened by the astride coil spring 78. In consequence, the projecting device 30 can be detached from the wall segment ring 92.

According to the mounting structure of the embodiment a as described thus far, with only the operation for winding and releasing the lifting wire 80 by using the chain block 93, the projecting device 30 can be attached to and detached from the wall segment ring 92. As a result, a workbench for attaching the projecting device or the like is not needed although the attachment location is a high place, and the attachment/detachment of the projecting device 30 can be extremely easily carried out. Furthermore, since the jig body 72 is formed in the quadrangular tubular shape, the light emitter 42 and the light receiver 36 of the projecting device 30 can be easily oriented in the axial direction of the tunnel with reliability. Incidentally, in this embodiment, the astride coil spring 78, located in the jig body 72, is used for opening the retention elements 74; however, as illustrated with the broken line in FIG. 7A, a coil spring 79, a plate spring, rubber, or the like can be used to correspond to each retention element 74. Further, the attachment jig 70 can be screwed into the backfill feeding hole.

Figure 9:
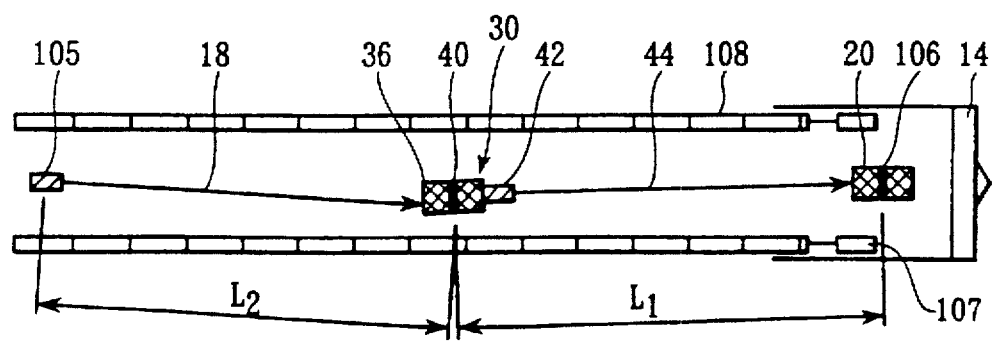
FIG. 9 is an explanatory view of an example of providing the projecting device according to the preferred embodiment as a relay switch.

FIG. 9 shows an example, in which one projecting device 30 is located as the relay switch between the first station, which is the control point, and a light receiver 20, which is provided in the shield machine 14 as the final station. The projecting device 30, as the relay switch, is attached to the wall segment ring 92 as described above. The projecting device 30 is provided to cause the laser beam 18, emitted from a light source (a laser projector) 105 provided at the first station, to be received into the light receiver 36. The first station is defined at, for example, the vertical tunnel starting shaft of the shield machine 14, in which the position of the light source 105 is precisely determined by a normal survey or the like. It is desirable that the light source 105 is positioned so as to cause the laser beam 18 to emit along the planning line of the tunnel.

In the projecting device 30, the light emitter 42 is oriented to the shield machine 14 to project a linear laser beam 44 toward the light receiver 20, which is provided in the shield machine 14. The measuring device, having the light receiver 20 in the shield machine 14, includes a rolling measure 106, in which a rolling degree (a rolling angle) of the shield machine 14 can be detected. Incidentally, 107 in FIG. 9 is a shield jack for advancing the shield machine 14 by using reaction against a wall segment 108.

In the provided projecting device 30 as described thus far, the laser beam 18, entering the light receiving device 38 in parallel to the optical axis 41 of the condenser lens 39 of the light receiver 36 as described above, is received at the center of the second light receiving face 38b as the origin. Therefore, as illustrated with a solid line in FIG. 2, when the laser beam 18 is received at the center of the second light receiving face 38b, the projecting device 30 has a posture in which the light receiving faces 38 of the light receiver 36 intersect the advancing direction of the laser beam 18 at a right angle even when leaning (rolling) around the advancing direction of the laser beam 18 occurs. For this reason, pitching (leaning in the vertical direction to the advancing direction of the laser beam 18) and yawing (leaning in the horizontal plane) do not occur in the projecting device 30. Therefore, the light emitter 42 emits the beam 44 in the same direction as the laser beam 18, for example, when the tunnel is linearly dug. The rolling degree of the light receiver 36 is detected by the rolling measure 40, provided in the light receiver 36, and inputted to the local controller 50. On the other hand, as illustrated with the broken line in FIG. 2, when the projected point of the laser beam 18 passing through the condenser lens 39 deviates from the center of the second light receiving face 38b, pitching, yawing or both pitching and yawing in the projecting device 30 is produced, so that the projecting direction of the beam 44 by the light emitter 42 should be adjusted. The adjustment is carried out by the local controller 50.

Figure 10:
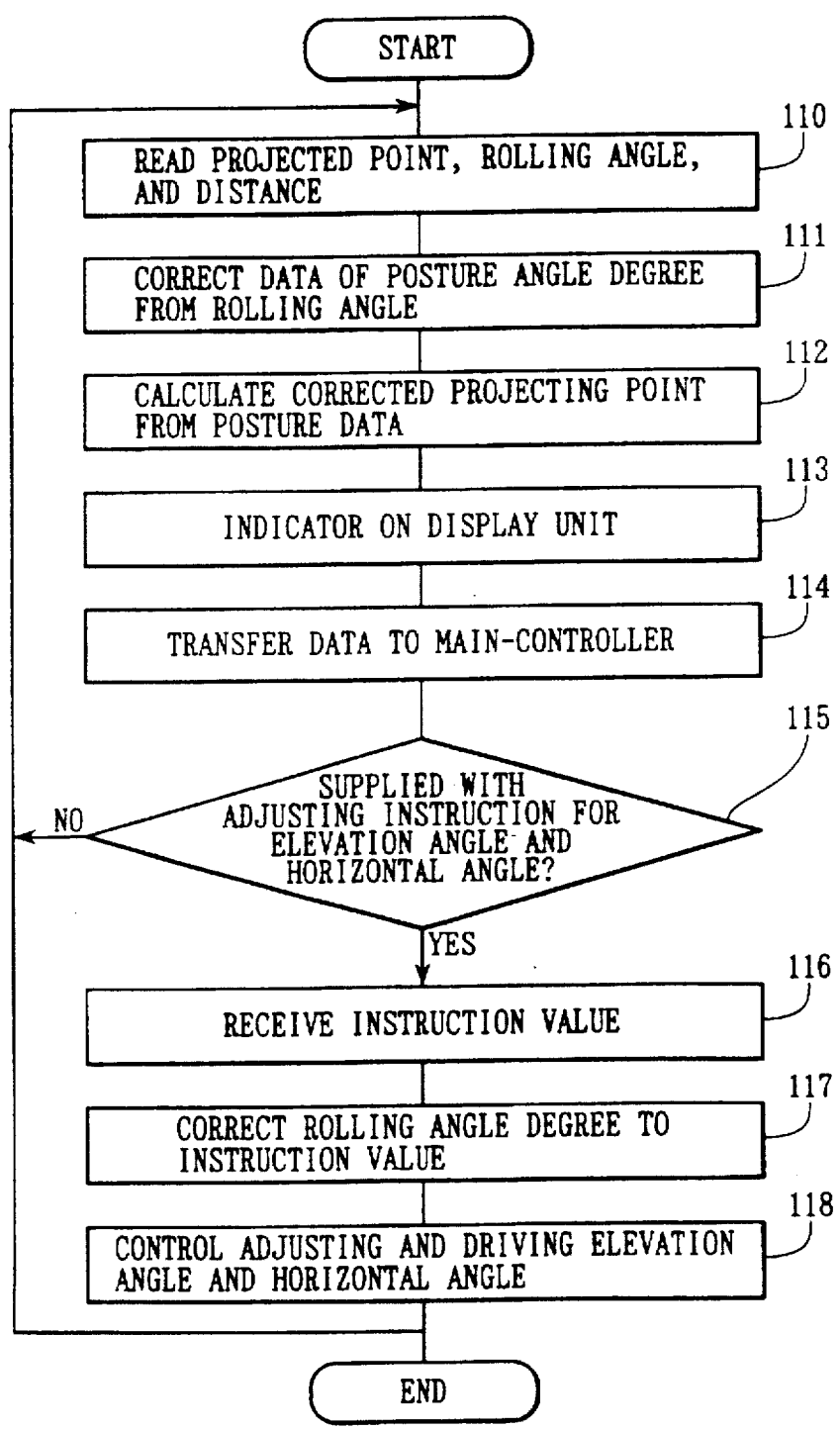
FIG. 10 is a flow chart explaining a controller operation of the projecting device according to the preferred embodiment.

As shown in FIG. 3, when the main controller 60 and the local controllers are mutually connected in parallel, the local controller 50, first reads the projecting point of the laser beam 18 on the first light receiving face 38a and the second light receiving face 38b as shown in Step 110 of FIG. 10. Concurrently with this reading, the controller 50 reads the rolling degree (the rolling angle) of the light receiver 36 from the rolling measure 40, and further loads the distance to the reflection prism provided in the next projecting device 30 or the shield machine 14, which is measured by the electrooptical macrometer 52. The controller 50 causes the coordinates of the first light receiving face 38a and the second light receiving face 38b to rotate in the opposite direction from the rolling direction for the same rotating degree as the rolling degree detected by the rolling measure 40 based on the program previously supplied from the main controller 60 (Step 111). Then, in the case of no rolling, the projecting points of the laser beam 18 on the first light receiving face 38a and the second light receiving face 38b (corrective projecting points) are determined (Step 112), and are indicated on the screen 55 and, at the same time, are transferred to the main controller 60 (Steps 113 and 114).

The main controller 60 calculates the pitching degree and the yawing degree of the light receiver 36 from the corrective projecting points of the first light receiving face 38a and the second light receiving face 38b, which are determined by the local controller 50 as described above, in order to determine the posture of the light receiver 36, namely, the posture of the projecting device 30. The calculation for determining the pitching degree and the yawing degree is easily performed by using optical analysis and trigonometry (tangent), because the magnification and the located position of the condenser lens 39 and the distance between the first light receiving face 38a and the second light receiving face 38b are previously supplied. When pitching and yawing are produced in the light receiver 36, the main controller 60 supplies to the local controller 50 an instruction for adjusting the vertical degree and the horizontal degree of the light emitter 42.

The local controller 50 transfers data to the main controller 60, and judges whether or not the instruction for adjusting the vertical degree and the horizontal degree of the light emitter 42 is supplied from the main controller 60 (Step 115). The local controller 50 returns to Step 110 when rolling is not produced in the light receiver 36, the laser beam 18 is received into the light receiving face 38 of the light receiver 36 at a right angle, the adjustment of the elevation angle and the horizontal angle of the light emitter 42 is not required, and the local controller 50 does not receive the adjusting instruction from the main controller 60. But, when the local controller 50 receives from the main controller 60 an instruction for adjusting the elevation angle and the horizontal angle, the local controller 50 captures an adjusting instruction value outputted from the main controller 60 (Step 116). The local controller 50 corrects for the rolling angle supplied as the instruction value, concurrently while adjusting the elevation angle and the horizontal angle of the light emitter 42 through the outgoing direction regulating device 43 (Steps 117 and 118).

In this embodiment as described thus far, since the projecting direction of the laser beam 18 of the light emitter 42 can be adjusted, the precise regulation of the optical axis is not required when the projecting device 30 is attached on the wall segment ring 92, thereby replacement work can be smoothly carried out, resulting in a great improvement of the efficiency of the tunnel constructing operation. Further, since the electro-optical macrometer 52 in the embodiment can also adjust the elevation angle and the horizontal angle, the electro-optical macrometer 52 can be oriented to face toward the shield machine 14 or the reflection prism provided in another projecting device 30, with the result that the impossibility of measuring the distance can be avoided.

Figure 11:
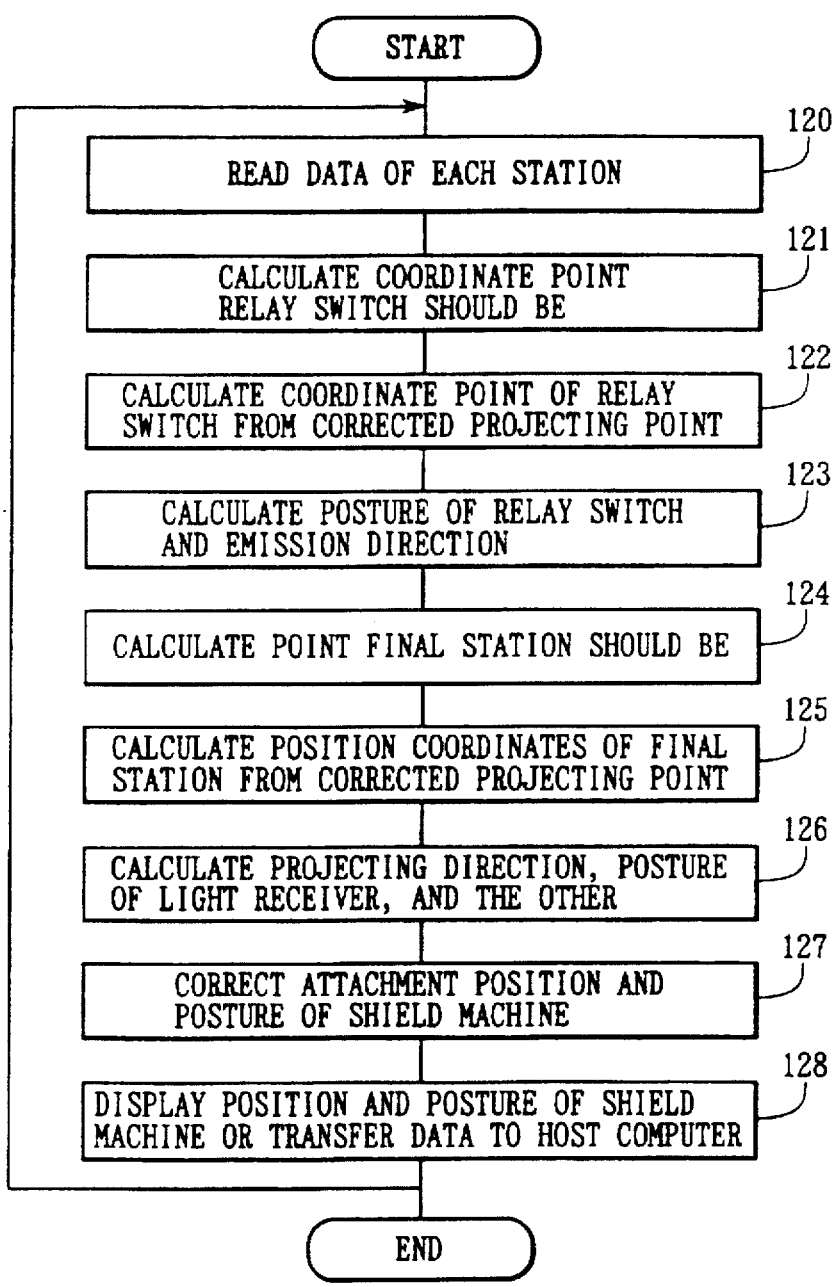
FIG. 11 is a flow chart explaining the operation of the main controller according to the preferred embodiment.

The main controller 60, as shown in Step 120 in FIG. 11, reads the measured data measured by the measuring devices, provided at each station, through the communication cable 62. The main controller 60 calculates the coordinate point at which the projecting device 30 should be, relative to the first station being the control point (Step 121). Thereafter, the main controller 60 calculates the coordinate point of the projecting device 30 from the corrected projecting point for the laser beam 18 on the first light receiving face 38a and the second light receiving face 38b of the light receiver 36, which is determined by and sent from the local controller 50 of the projecting device (the relay switch) 30 (Step 122). The main controller 60 calculates the projecting direction (the radiation direction) of the beam 44 from the angle of the light emitter 42 while determining the posture of the projecting device 30 as described above, based on the corrected projecting point supplied from the controller 50 (Step 123).

Next, the main controller 60 calculates a point, at which the final station defined at the shield machine 14 should be, from the position of the projecting device 30 in the tunnel, the projecting direction of the beam 44 which is determined in Step 123, and the distance to the final station determined by the electro-optical macrometer 52, and further it calculates the position coordinates of the final station from the corrected projecting point on the light receiver 36 for the laser beam at the final station determined in an above like manner (Steps 124 and 125). The main controller 60 calculates the posture of the final station light receiver from the projecting direction of the beam 44, caused by the light emitter 42 in the projecting device 30, the posture of the light receiver provided at the final station, and the rolling angle of the shield machine 14 (Step 126). The main controller 60 determines corrected values of the attachment position and the posture of the light receiver in the shield machine 14 (Step 127), and further, it indicates the position and the posture of the shield machine 14 on a display unit (not shown) and transfers the determined data to a host controller (not shown) (Step 128). As a result, the position and the posture of the shield machine 14 can be detected and the correction of the advancing direction and the posture of the shield machine 14 can be naturally carried out with precision, resulting in the possibility of the construction of the tunnel along the tunnel planning line.

Figure 12A:
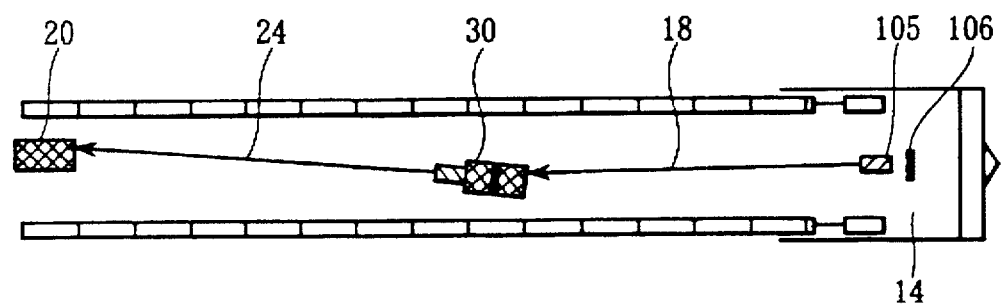
FIG. 12A is an explanatory view of an example using the other stations for the preferred embodiment, in which the site of the tunnel forming machine is defined as a first station and the site of a control point is defined as a final station.
Figure 12B:
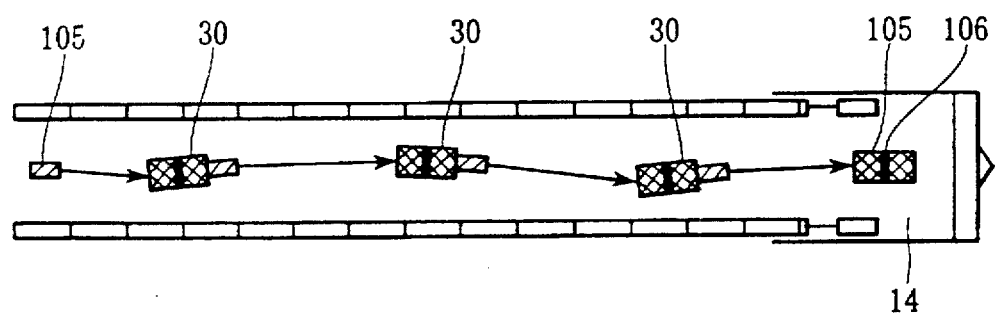
FIG. 12B is an explanatory view of an example of the other relay switches according to the preferred embodiment, in which multiple projecting devices act as the relay switches.

FIG. 12A shows an example when the shield machine 14 is defined as the first station and the rear end of the tunnel is defined as the final station. In this example, by precisely determining three elements as to the position and three elements as to the posture of the light receiver 20 provided at the final station, as in the aforementioned case, the position of the shield machine 14 can be determined. FIG. 12B shows an example when multiple projecting devices 30 are provided as the relay switches in the tunnel, in which the position of the projecting device 30 and the position of the shield machine 14 can be determined by inputting the number of projecting devices 30 into the main controller 60 and repeating the data processing routine for the number of projecting devices 30.

Figure 13:
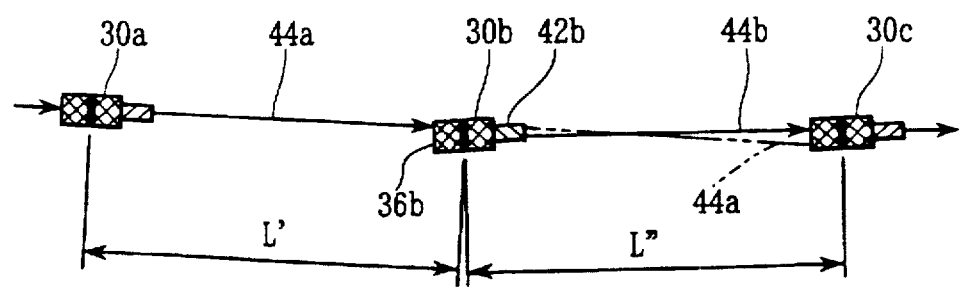
FIG. 13 is an explanatory view showing an example of the adjustment for the posture of a projecting device according to the preferred embodiment.
Figure 14:
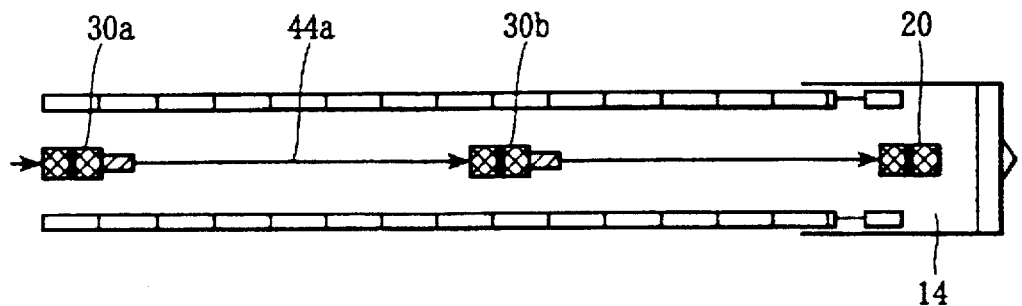
FIG. 14 is an explanatory view of the finished state of replacement work using a projecting device according to the preferred embodiment.
Figure 15:
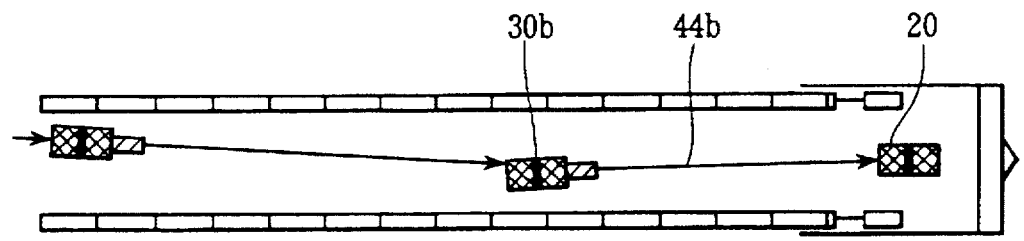
FIG. 15 is an explanatory view of the state in which the posture of a projecting device according to the preferred embodiment is adjusted to project a beam to the light receiver of the final station.
Figure 16:
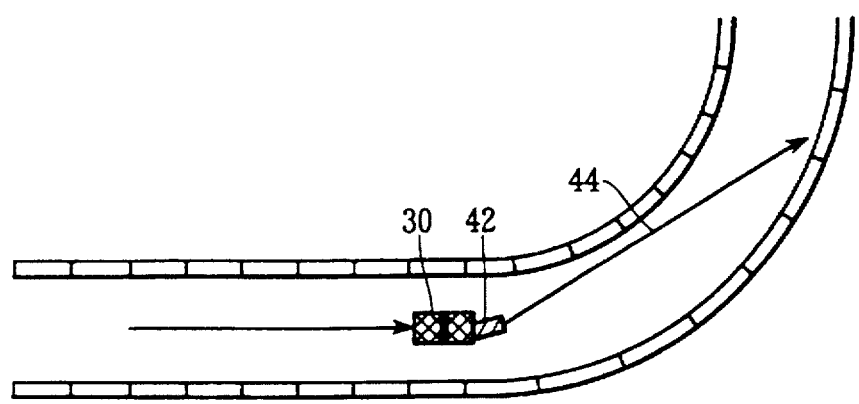
FIG. 16 is an explanatory view of an example of changing the projecting direction of the beam from the projecting device according to the preferred embodiment.

FIG. 13 shows an example of providing the condition of the projecting device 30, in which, even when a mid-positioned projecting device 30b is provided in a leaning state for an emission beam 44a emitted from a projecting device 30a, a beam 44b can be projected to the next projecting device 30c by adjusting the projecting direction of the beam from a light emitter 42b. FIG. 14 shows the finished state of the replacement work for the protecting device 30b, more specifically, with advancing the bore by the shield machine 14 as shown in FIG. 21B, the beam 44a emitted from the projecting device 30a can not reach the light receiver 20 provided in the shield machine 14, so that the replacement work for the projecting device 30 is required and carried out. FIG. 15 shows an example in that the beam 44b is adjusted to impinge on the light receiver 20 by controlling the posture of the projecting device 30b. Further, FIG. 16 shows an example wherein the projecting direction of the beam 44, from the light emitter 42 provided in the projecting device 30, is changed at the curving line portion of the tunnel and the like.

Figure 17A:
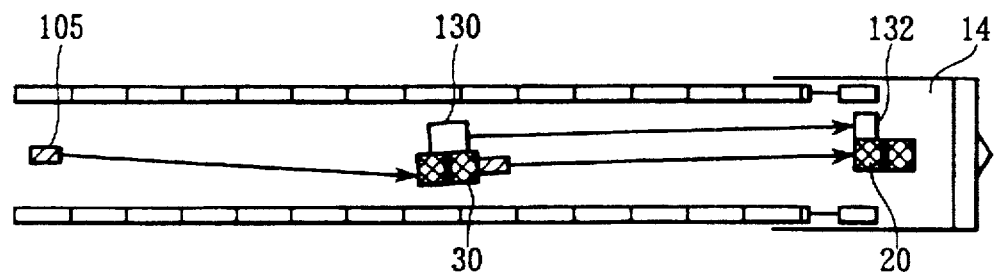
Figure 17B:
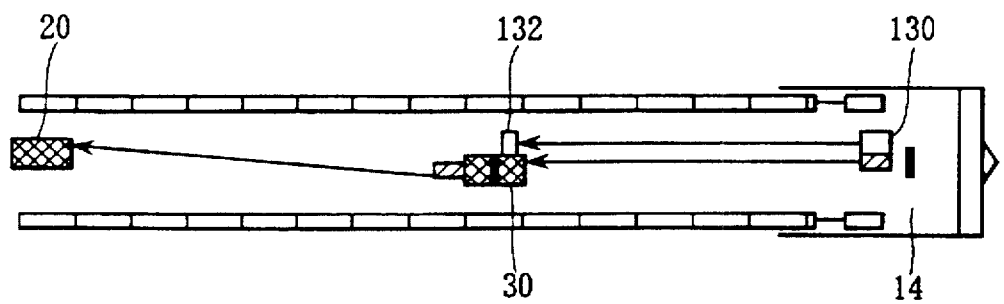

FIGS. 17A and 17B show examples wherein the measurement of the distance is accomplished by the electro-optical distance meter. FIG. 17A is an example wherein the electro-optical distance meter 130 is provided in the projecting device 30 and a reflection prism 132 is provided in the shield machine 14. FIG. 17B is an example wherein the electro-optical distance meter 130 is provided in the shield machine 14 and the reflection prism 132 is provided in the projecting device 30.

Figure 18:
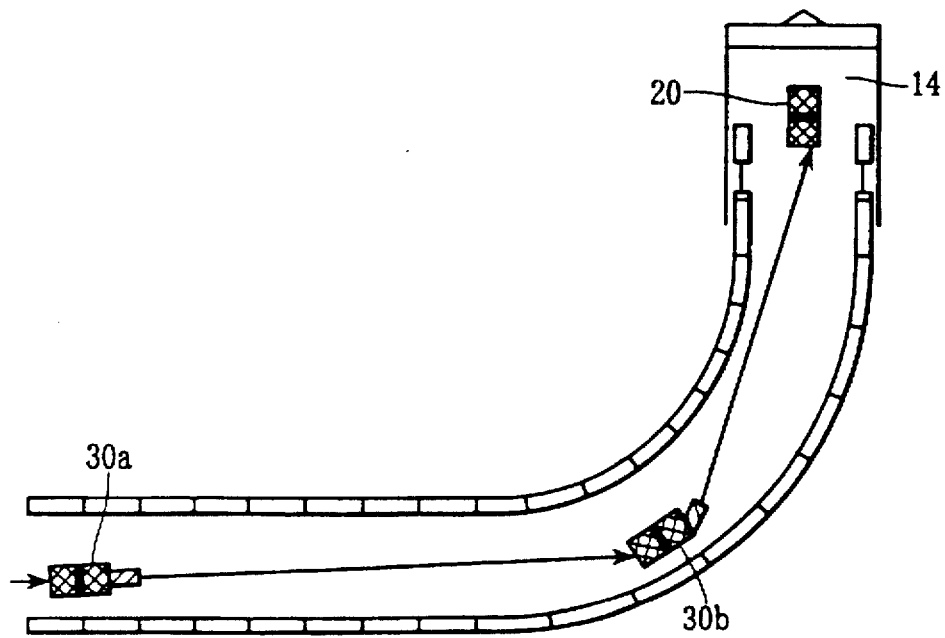
FIG. 18 is an explanatory view when a projecting device according to the preferred embodiment is located in a curved line portion of the tunnel.
Figure 19:
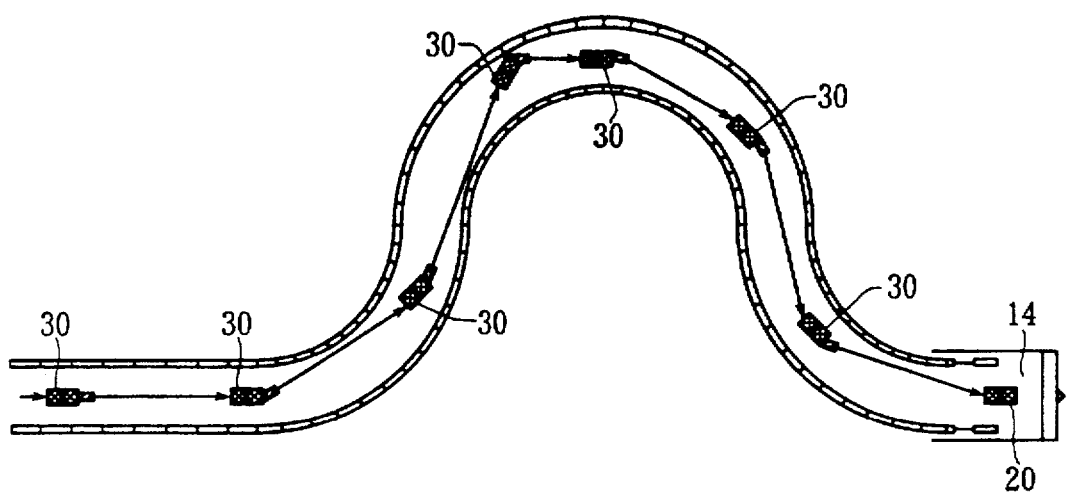
FIG. 19 is an explanatory view when a projecting device according to the preferred embodiment is applied to a tunnel having a complicated configuration.

FIG. 18 shows an example of the use of the projecting device 30 of the embodiment in a curving line portion of the tunnel. Using the projecting device 30 of the embodiment as described above, the first station or the projecting device 30 can be provided at the permanent point located a sufficient distance from the shield machine 14, resulting in the possibility of precision measurement. FIG. 19 shows a providing condition of the projecting device 30 according to the embodiment in a tunnel having a complicated configuration, in which the position of the shield machine 14 can be determined by performing the aforementioned steps in spite of such a complicated configuration of the tunnel.

Figure 20:
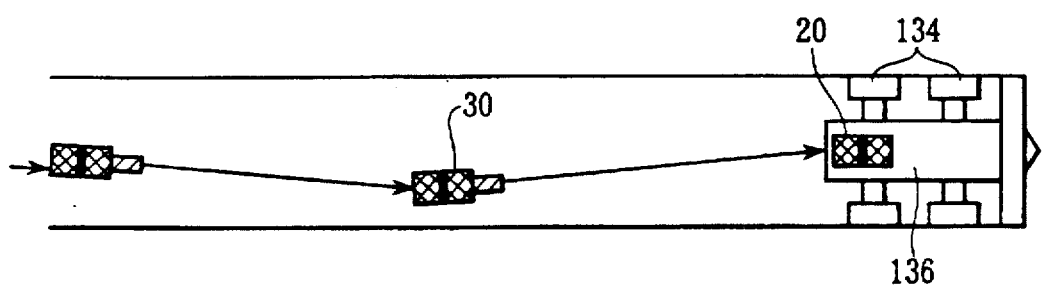
FIG. 20 is an explanatory view when a projecting device according to the preferred embodiment is applied to a tunnel boring machine which is to obtain reaction for the bored wall.

In the aforementioned embodiment it has been explained as to the case in which the shield machine is used as the tunnel forming machine, however, as shown in FIG. 20, the embodiment can be applied to a tunnel boring machine (TBM) 136, which obtains reaction by extending a gripper 134 onto the bored wall, as well as the shield machine 14. In the aforementioned embodiment, the detection of the distance between the first station and the projecting device 30, the distance between two projecting devices 30, and the distance between the projecting device 30 and the final station by the electro-optical macrometer 52 has been explained; however, the distance between the first station and the projecting device 30 and the distance between two projecting devices 30 can be determined by counting the number of wall segments and the distance between the projecting device 30 and the final station can be determined from the number of wall segments and the amount of stroke from the shield jack 107.

In the aforementioned embodiment, the case, in which each of the first light receiving face 38a and the second light receiving face 38b is composed of a position detecting sensor for two-dimensionally detecting the projected point when receiving and transmitting the light beams, has been explained; however, the second light receiving face 38b can be composed of a sensor arranged with CCD or a lot of light elements in a plane. Thus, the cost of the light receiver 36 can be reduced. In the aforementioned, the light receiving faces 38a and 38b are square, but can be circular or another configuration. The condenser lens 39 located forwardly of the first light receiving face can be located at the position in which the light beam comes into focus on the second light receiving face between the first light receiving face and the second light receiving face, and further, in extreme cases, may be omitted.

The aforementioned embodiment has been explained as to the case in which the attachment jig 70 has the retention elements 74, and attaches the projecting device 30 to the wall segment by stopping the retention elements 74 on the stop element 98 provided in the side of the wall segment; however, the attachment jig 70 can be formed with a threaded portion to screw into a backfill feeding hole which is opened in the wall segment. In the aforementioned embodiment, the posture of the light receiver 36 is determined by the main controller 60, but can be determined by the local controller 50.

As explained thus far, according to the positional measurement projecting device of the present invention, since the control unit adjusts the projecting direction of the light beam from the light emitting device to emit toward the specified target point in response to the incident direction of the light beam entering the light receiving device from the light source, the conventional precise adjustments of the optical axis and level are not required, resulting in the possibility of a smooth replacement work, and naturally, speed and efficiency of the tunnel constructing operation.

Each of the light beams, emitted from the light source and the light emitting device, is a linear beam, so that the direction of the light beam incident to the light receiving device can be easily determined. Furthermore, since the rolling degree of the body is detected by providing a rolling detection device in the body, the pitching degree and the yawing degree of the light receiving device (the body) can be determined not to be influenced by a rolling in the incident direction of the light beam entering the light receiving device. In consequence, in consideration of things as described above, the projecting direction of the light beam from the light emitting device can be defined with precision. By structuring the light receiver to arrange multiple light receiving elements in a plane, the range capable of receiving a light beam emitted from the light source is larger, so that the incident point can be two-dimensionally detected, with the result that it is convenient for determining the posture of the body.

Two light receiving faces are provided to have a specified space therebetween in the light receiving device, so that the incident direction of the light beam entering the light receiving device can be easily sensed. When the second light receiving face, located on the back side to face the incident light beam, is composed of a sensor arranged with CCD or multiple light receiving elements in a plane, the cost for the device can be reduced. The body has the light distance measuring device, so that the distance to the target point, such as the tunnel forming machine, can be measured. Since the light distance measuring device is capable of adjusting the elevation angle and the horizontal angle, the light distance measuring device can be oriented with reliability to face the reflection device as the target point, resulting in ensured measurement of the distance. Further, since the reflection device for measuring distance is provided in the body, it is possible to measure the distance by the other measuring devices.

In the mounting structure for the projecting device according to the present invention, the projecting device can be easily attached to the existing wall segment by lifting the upper device of the jig body from the opening in the stop element and stopping and supporting the astride retention elements on the stop element. By moving the jig body further upwardly, the closing member closes the retention elements, so that the stopping state of the retention elements is released, and the jig body can be easily detached from the wall segment. Therefore, the projecting device can be easily attached/detached, resulting in a speedy operation of the tunnel construction.

By using the coil spring, located in the jig body, as an elasticated body, the structure can be simple. Since the jig body is provided with the through hole for the wire, and the wire hitching element for hitching the wire is provided upwardly of the stop element, the jig body attaching the projecting device can be moved upwardly and downwardly, e.g., by the use of a pulley. In consequence, the attachment and detachment of the projecting device can be easily carried out without the need of a workbench for attaching the projecting device or the like, resulting in a reduction of workload and risk to a worker.

INDUSTRIAL AVAILABILITY

The present invention allows speed and efficiency of the tunnel constructing operation in view of the possibility of a smooth replacement work, and serves a useful purpose as a positional measurement projecting device and a mounting structure for the projecting device which are capable of measuring the distance and the projecting direction of light from a light emitter and of easily attaching and detaching the projecting device.

I claim:

1. A positional measurement projecting device, which is suitable for placement between a control point and a tunnel forming machine in a tunnel so as to receive a first light beam emitted from a light source provided at a first one of the control point and the tunnel forming machine and for relaying a second light beam to a second one of the control point and the tunnel forming machine, said positional measurement projecting device comprising:

a body;

a light receiving device positioned in said body for receiving from a first direction said first light beam which is incident on said light receiving device and which has been emitted from said light source toward said light receiving device, said light receiving device outputting a receiving light signal;

a light emitting device positioned in said body and having a laser oscillator for emitting a second light beam in a second direction, said second direction being generally opposite to said first direction and having a horizontal angle and an elevational angle;

an outgoing direction regulating device positioned in said body for swinging said second light beam in a horizontal direction and in a vertical direction in order to thereby adjust said horizontal angle and said elevational angle of said second direction; and a control unit for determining, based on said receiving light signal, said first direction from which said first light beam is incident on said light receiving device and for controlling said outgoing direction regulating device to cause said second direction to be toward a specified target point.

2. A positional measurement projecting device in accordance with claim 1, wherein said tunnel has an axis;

wherein each of said first and second light beams is a linear beam; and wherein said positional measurement projecting device further comprises a rolling detection device positioned in said body for detecting rotation around an axis which is parallel to said axis of said tunnel.

3. A positional measurement projecting device in accordance with claim 2, wherein said light receiving device produces a projected point in response to receiving said first light beam, wherein said light receiving device has a position detecting sensor for two-dimensionally determining a location of said projected point and for determining said first direction at which said first light beam is incident to said light receiving device, and wherein said receiving light signal includes information as to the thus determined location of said projected point and the thus determined first direction.

4. A positional measurement projecting device in accordance with claim 3, wherein said control unit controls said outgoing direction regulating device to adjust said elevation angle and said horizontal angle of said second direction based on the thus detected rotation, the thus determined projected point, and the thus determined first direction.

5. A positional measurement projecting device in accordance with claim 4, further comprising a light distance measuring device positioned in said body for measuring a distance to said specified target point.

6. A positional measurement projecting device in accordance with claim 5, wherein said light distance measuring device is adjustable in the vertical direction and in the horizontal direction.

7. A positional measurement projecting device in accordance with claim 1, further comprising a light distance measuring device positioned in said body for measuring a distance to said specified target point.

8. A positional measurement projecting device in accordance with claim 7, wherein said light distance measuring device is adjustable in the vertical direction and in the horizontal direction.

9. A positional measurement projecting device in accordance with claim 1, wherein said light receiving device produces a projected point in response to receiving said first light beam, wherein said light receiving device has a position detecting sensor for two-dimensionally determining a location of said projected point and for determining said first direction at which said first light beam is incident to said light receiving device, and wherein said receiving light signal includes information as to the thus determined location of said projected point and the thus determined first direction.

10. A positional measurement projecting device in accordance with claim 1, wherein said light receiving device comprises a condensing lens, a first light receiving face, and a second light receiving face, said condensing lens having an optical axis which intersects each of said first and second light receiving faces at a right angle, said first light receiving face being positioned between said condensing lens and said second light receiving face, said second light receiving face being located a specified distance from said first light receiving face so that a light beam entering said condensing lens parallel to said optical axis is received at a center portion of said second light receiving face.

11. A positional measurement projecting device in accordance with claim 10, wherein said second light receiving face is composed of CCD.

12. A positional measurement projecting device in accordance with claim 1, further comprising a reflection device positioned in said body for reflecting a beam incident thereon substantially in its direction of incidence.

* * * * *